US011983211B2

(12) United States Patent
Agarwal (10) Patent No.: US 11,983,211 B2
(45) Date of Patent: May 14, 2024

(54) SYSTEM AND METHOD FOR MERGING AND SPLITTING OF MESSAGES WITH USER INPUT IN AIR TRAFFIC COMMUNICATION (ATC) TRANSCRIPTION

(71) Applicant: HONEYWELL INTERNATIONAL INC., Charlotte, NC (US)

(72) Inventor: Jitender Kumar Agarwal, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 0 days.

(21) Appl. No.: 17/812,625

(22) Filed: Jul. 14, 2022

(65) Prior Publication Data
US 2023/0385323 A1   Nov. 30, 2023

(30) Foreign Application Priority Data
May 31, 2022   (IN) .............................. 202211031083

(51) Int. Cl.
*G06F 16/35* (2019.01)
*G06F 16/34* (2019.01)
(Continued)

(52) U.S. Cl.
CPC .............. *G06F 16/35* (2019.01); *G06F 16/34* (2019.01); *G06F 40/166* (2020.01); *G10L 15/26* (2013.01);
(Continued)

(58) Field of Classification Search
CPC ......... G10L 15/26; G10L 15/04; G10L 15/05; G06L 2015/221; G06F 16/35;
(Continued)

(56) References Cited

U.S. PATENT DOCUMENTS 10,002,611 B1 * 6/2018 Typrin .................... H04L 51/10
10,388,272 B1   8/2019 Thomson et al.
(Continued)

FOREIGN PATENT DOCUMENTS

CN   103369122 A   10/2013

OTHER PUBLICATIONS

Juan Zuluaga-Gimez et al "BERTraffic: BERT-based Joint Speaker Role and Speaker Change Detection for Air Traffic Control Communications", arXiv.org, Mar. 31, 2022 (Mar. 31, 2022), XP091171340.

*Primary Examiner* — Daniel Samwel
(74) *Attorney, Agent, or Firm* — Lorenz & Kopf LLP (57) ABSTRACT

A system is provided that includes a processor configured to receive an input of a user in response to a display of a text segment generated by a decode operation of an audio segment wherein the processor is configured to if the user determines by viewing a display containing one or more text segments that the one or more text segments include an improper splitting of text segments, perform a merge action in response to a user input to merge the one or more text segments into a single text segment for display; and if the user determines by viewing a display containing the at least one single text segment that the at least one single text segment should be split, perform a split action in response to the user input to split the at least one single text segment into the one or more text segments.

16 Claims, 7 Drawing Sheets

(51) Int. Cl.
  *G06F 40/166* (2020.01)
  *G10L 15/04* (2013.01)
  *G10L 15/26* (2006.01)
  *G08G 5/00* (2006.01)

(52) U.S. Cl.
  CPC ......... *G08G 5/0013* (2013.01); *G08G 5/0021* (2013.01); *G10L 15/04* (2013.01)

(58) Field of Classification Search
  CPC ..... G06F 16/34; G06F 40/166; G08G 5/0013; G08G 5/0021
  See application file for complete search history.

(56) References Cited

U.S. PATENT DOCUMENTS

| | | | |
|---|---|---|---|
| 2008/0045198 A1* | 2/2008 | Bhogal | G08G 5/0021 455/414.4 |
| 2009/0052636 A1* | 2/2009 | Webb | H04M 3/53333 704/235 |
| 2009/0063150 A1* | 3/2009 | Nasukawa | G10L 15/26 704/E15.006 |
| 2010/0268534 A1 | 10/2010 | Kishan Thambiratnam et al. | |
| 2010/0332518 A1* | 12/2010 | Song | G06F 3/0483 715/810 |
| 2013/0346081 A1* | 12/2013 | Loubiere | G08G 5/0013 704/260 |
| 2014/0207453 A1 | 7/2014 | Shin et al. | |
| 2014/0308933 A1* | 10/2014 | Martin | H04W 4/18 455/414.1 |
| 2015/0066505 A1 | 3/2015 | Baker | |
| 2015/0081292 A1* | 3/2015 | Populus | G08G 5/0095 704/235 |
| 2016/0014482 A1* | 1/2016 | Chen | H04N 21/8456 386/241 |
| 2016/0155435 A1* | 6/2016 | Mohideen | G10L 15/01 704/235 |
| 2016/0202950 A1* | 7/2016 | Hawley | G08G 5/0052 700/94 |
| 2020/0364452 A1* | 11/2020 | Pellinen | G06V 30/418 |
| 2021/0174787 A1 | 6/2021 | Nguyen et al. | |
| 2022/0115008 A1* | 4/2022 | Pust | G08G 5/0013 |

\* cited by examiner

SYSTEM AND METHOD FOR MERGING AND SPLITTING OF MESSAGES WITH USER INPUT IN AIR TRAFFIC COMMUNICATION (ATC) TRANSCRIPTION

CROSS-REFERENCE TO RELATED APPLICATION

This application claims priority to India Provisional Patent Application No. 202211031083, filed May 31, 2022, the entire content of which is incorporated by reference herein.

TECHNICAL FIELD

The subject matter described herein relates generally to vehicle systems, and more particularly, embodiments of the subject matter relate to avionics systems and methods for reviewing and determining improper combinations or splitting of text segments of transcribed text that is displayed and for providing user input for re-splitting or merging of the text segments for an enhanced display of the transcribed text.

BACKGROUND

Even though datalink technologies are employed in in-flight communications, a majority of communications between an Air Traffic Controller (ATC) and a pilot is through speech using cockpit radio channels. Speech recognition applications are used in aircraft systems for transcription of ATC-pilot communications as well as for providing other commands, control, and automatic terminal information service (ATIS) information.

In general, ATC and flight personnel (i.e., the pilot) are trained to speak at a faster than normal rate (i.e., word speaking rate), and this word rate is changed by either party based on current traffic or other situational events. For example, if the traffic is deemed less in the vicinity when ATC-pilot communications take place, either party may intercede longer than normal pauses in communication exchanges. Alternately, if the traffic is deemed more in the vicinity, or during other situational driven events such as bad weather, or an in-flight emergency, the ATC-pilot communications exchanged occur with both shorter pauses and a higher rate of speaking. Other changes in the speaking rate can simply be due to a particular speaker's own speaking rate characteristics. For example, some speakers may simply speak faster in normal conversation. Also, extra pauses or longer pauses in ATC-pilot communications can occur when either part is multi-tasking and/or not taking part immediately in the conversation.

The segmentation logic used in speech transcription is a probabilistic model and is likely trained with certain data consistent with the most common word rate used during communications, and therefore any drastic change in speech rate will likely impact the accuracy of the segmentation logic. For example, this may cause a transcription application in use to end up with erroneous message splits for a single message or end up with improper multiple split messages of transcribed text.

The erroneous splits in messages can create a flurry of smaller text segments, which can affect flight operations by making it harder to determine or decipher callsigns with associated clearance messages for example; and also cause incorrect message classifications in message displays. Also, the use of automated processes such as Natural Language Processing (NLP) or other post-processing techniques to classify messages, the intent of a clearance message or to derive critical information from the text segment can prove to be deficient. As a result of these deficiencies, in the case of transcription of larger text segments with multiple clearances messages can be displayed with multiple callsigns or multiple sets of critical information or data extraction from a transcribed segment that prevents the proper association of the transcribed text to a certain callsign reducing the value of the displayed text. Also due to excessive segmentation, the flurry of smaller text segments without any callsigns or critical information is displayed.

It is therefore desirable to address the deficiencies of current transcription by providing systems and processes that enable convenient user review and input of transcribed messages for merging and splitting action to displayed messages to improve the readability of transcription app and to enable efficient use of NLP or post-processing, to extract useful information and highlight it for a user and to derive useful information for training a speech model, and to better identify the correct call sign and critical data inside messages thereby improving the overall display of messages by the transcription application.

Other desirable features and characteristics of the methods and systems will become apparent from the subsequent detailed description and the appended claims, taken in conjunction with the accompanying drawings and the preceding background.

BRIEF SUMMARY

Aircraft systems and related operating methods are provided. In one embodiment, a system is provided that includes a processor disposed in a transcription device configured to receive an input of a user in response to a display of at least one text segment generated by a decode operation of a decoder of an audio segment received by the transcription device wherein the processor is configured to: if the user determines by viewing a display containing one or more text segments that the one or more text segments include an improper splitting of text segments, perform a merge action in response to a user input to merge the one or more text segments into at least one single text segment for display; and if the user determines by viewing a display containing the at least one single text segment that the at least one single text segment should be split, perform a split action in response to the user input to split the at least one single text segment into the one or more text segments; and update a graphical user interface (GUI) on a display device coupled to the transcription device to display either the at least one single text segment or the one or more text segments that have been configured by the merge action or split action based on the user input.

In at least one embodiment, the system includes the processor that is further configured to determine a callsign associated with the at least one single text segment or the one or more text segments after user input; and classify the at least one single text segment of the one or more text segments based on the callsign.

In at least one embodiment, the system includes the processor that is further configured to: enable a merge action of the one or more text segments with another text segment to display the at least one single text segment on the display device in accordance with the identified callsign and message classification.

In at least one embodiment, the system includes the processor that is further configured to: in response to the user input, perform the merge action or split action in an audio domain of the audio segment and display the message with playback of merged or segmented audio based on the user input.

In at least one embodiment, the system includes the processor that is further configured to: in response to the user input, perform the merge action or the split action in the audio domain of the audio segment to enable the merging or splitting of one or more text segments during a re-decode operation.

In at least one embodiment, the system includes the processor that is further configured to: display a set of cues with at least the one or more text segments to assist the user in marking the merge action or the split action of the one or more text segments that are displayed on the display device.

In at least one embodiment, the split action performed by the user applies to one or more text segments to generate at least a first text segment part composed of several words, and a second text segment part composed of at least one word.

In at least one embodiment, the system includes the processor that is further configured to log at least one or more user inputs to update an Automatic Speech Recognition (ASR) model used in the decode operation and the re-decode operation of the audio segment, and for use in determining suggestions in one or more text segments.

In at least one embodiment, the system includes the processor that is further configured to: enable a natural language processor (NLP) in operable communication with the decoder to provide content-based analysis about the one or more text segments or the at least one single text segment for the decode operation.

In at least one embodiment, an unsplit text segment is caused by at least a pause in an incoming audio segment that is improperly determined as a split of at least one text segment in the decode operation.

In at least one embodiment, the pause is approximately in a range of 200 to 700 microseconds.

In another exemplary embodiment, a method of implementing a transcription system is provided. The method includes receiving an input by a processor disposed in a transcription device of a user in response to a display of at least one text segment generated by a decode operation of a decoder of an audio segment received by the transcription device; performing, by the processor, a merge action in response to a user input to merge at least one text segment into at least one single text segment for display if the user determines, by viewing a display containing the at least one text segment, that the at least one text segment includes an improper splitting of text segments; performing, by the processor, a split action in response to the user input to split the at least one single text segment into the at least one text segment if the user determines, by viewing a display containing the at least one single text segment, that the at least one single text segment should be split; and updating, by the processor, a graphical user interface (GUI) on a display device coupled to the transcription device to display either the at least one single text segment or the at least one text segment that has been configured by the merge action or split action based on the user input.

In at least one exemplary embodiment, the method further includes determining, by the processor, a callsign associated with the at least one single text segment or the one or more text segments; and classifying, by the processor, the at least one single text segment of the one or more text segments based on the callsign.

In at least one exemplary embodiment, the method further includes merging, by the processor, one or more text segments with another text segment to display at least one single text segment on the display device in accordance with the callsign.

In at least one exemplary embodiment, the method further includes performing, by the processor, the merge action or the split action in an audio domain of the audio segment to enable the merging or splitting of one or more text segments during a re-decode operation.

In at least one exemplary embodiment, the method further includes displaying, by the processor, a set of cues with at least one or more text segments to assist the user in marking the merge action or the split action of the one or more text segments on the display device.

In at least one exemplary embodiment, the method further includes logging, by the processor, at least one or more user inputs to update an Automatic Speech Recognition (ASR) model used in the decode operation and the re-decode operation of the audio segment.

In at least one exemplary embodiment, the method further includes enabling a natural language processor (NLP) in operable communication with the decoder to provide content-based analysis about the one or more text segments or the at least one single text segment for the decode operation.

In yet another exemplary embodiment, at least one non-transient computer-readable medium having instructions stored thereon that are configurable to cause at least one processor to perform a method to merge or split a text segment displayed by a transcription system is provided. The method includes receiving an input by a user in response to a display of at least one text segment generated by a decode operation of a decoder of an audio segment received by the transcription system wherein the processor is configured to: performing a merge action in response to a user input to merge at least one text segment into a single text segment for display if the user determines, by viewing a display containing the at least one text segment, that the at least one text segment includes an improper splitting of the text segment; performing a split action in response to the user input to split the at least one single text segment into the at least one text segment if the user determines, by viewing a display containing the at least one single text segment, that the at least one single text segment should be split; and updating a graphical user interface (GUI) on a display device coupled to the transcription system to display either the at least one single text segment or the at least one text segment that has been configured by the merge action or split action based on the user input.

In at least one exemplary embodiment, the method further includes determining, by the processor, a callsign associated with the at least one single text segment or the one or more text segments; classifying, by the processor, the at least one single text segment of the one or more text segments based on the callsign; and merging, by the processor, one or more text segments with another text segment to display the at least one single text segment on the display device in accordance with the callsign.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

The Air Traffic Controller (ATC) is typically involved with voice communications between a pilot or crewmember onboard the various aircraft within controlled airspace. The ATC and the pilot are often in constant communication over a Voice Channel or the CPDLC throughout the flight. The ground-to-air communications include clearance, information, or requests for message elements. The ATC to pilot communications has several limitations including, but not restricted to, miscommunication, transmission errors, misinterpreted voice instructions, ambiguous communications, and non-standard phraseology that can cause an increased pilot overload of operational tasks when listening to ATC amidst flying the aircraft.

Because of the fast-paced environment in the control tower, and this is especially the case at large and busy airports that handle a voluminous number of take-offs and landings at any given time of the day, the controllers in this type of environment often speak faster than in a normal speech environment to save time which is in part because of the need to respond to multiple requests from aircraft traffic in the vicinity. This is also true in instances when responses on the part of the controllers are required that are deemed formalities such as customary confirmations of a pilot readback of clearance or other flight instructions.

This faster rate of dialogue causes the duration of pauses between the common back and forth exchanges between a controller and a pilot, such as during broadcasting and confirming of a clearance message, to be shorter than experienced in normal conversation. For example, the time difference between the back and forth in a controller/pilot dialogue can be as low as approximately 12 ms. Any time difference of fewer than 20 ms is deemed significantly less than normal pauses between speakers, which are usually in the range of thirty to forty seconds. The result is that the operation of conventional Voice Activity Detection (VAD) devices used to monitor fast controller/pilot dialogues by transcription systems may not function properly, as the devices are not configured to take into account such low time differences between two conversants. The conventional VAD device as an example, may not detect instances of a speaker change because of its inability to detect the speaker change in short pauses where speaker switchovers occur in a dialogue.

When the time difference between speaker responses in the dialogue falls within a ten-microsecond range, the VAD device in operation may not be able to properly segment a clearance message that is being exchanged between parties. This will cause different message segments that are intended to be separated in a clearance instruction to be mis-joined and a confusing message will be displayed to the pilot that may not be readily readable and may require some further effort and time on the part of the pilot to decipher.

There are other sources, too, that contribute to communication errors in ATC to pilot dialogue and include cockpit transcription systems that generate long unsplit text segments that are displayed for pilot review. If the pause or silence between the ATC clearance is followed by a pilot response or vice versa, and there is an overlap caused by noise or other audio alerts or ATIS or pilot intercom audio, the VAD device in a transcription system can fail to detect a split point in the audio segment and then the result is a long unsplit audio segment for decoding.

Typically, in a flight, almost 10-30 percent of unsplit segments are observed and thus the high number of unsplit segments impacts the ATC transcription performance Although a major contributor to the unsplit segment is due to overlap of intercom or ATIS, a small percentage is still due to VAD operational issues. If the VAD device is better trained to cope with pauses and segments within 10-20 ms, the percentage of unsplit segments may be reduced. There is also a balance required length, as even if a better trained VAD device is used, short utterances can cause unsatisfactory split segments, so there is a trade-off in setting the appropriate VAD threshold to deduce the split point. Therefore, it is desirable to mitigate the need for unsplit segments by determining appropriate split points to split the segment for optimal performance of the speech decoder and to improve the overall ATC transcription performance.

In in-flight operations, there exists a large number of terminology associated with different arrival procedures, approaches, and departure procedures. The ATC-pilot communication in a customary dialog will contain a general class of keywords that includes call sign specific keywords that allow both parties in the communication dialog to know or identify the flight to prevent or at least limit confusion with respect to flight specific instructions. In embodiments, the ATC-pilot communication may include a realm of different types of messages that include a clearance instruction, an advisory message, or query (question) issued by the controller to the pilot as well as readback requests, reports, or queries issued by the pilot to the controller. In either case, there may be specific keywords used in the respective flight operations that can be used to better segment a transcribed communication for a display to the pilot.

It is desirable to provide processes and systems that overcome decode errors caused by improperly unsplit messages in a real-time flight transcription of incoming audio segments of ATC communications.

It is desirable to provide processes and systems that reduce errors or failures in the accuracy of message transcriptions so that further transcription errors are not caused as a result of the unsplit message decode errors in a post or subsequent processing step used in the transcription process such as Natural Language Processing (NLP) applications.

In various exemplary embodiments, the present disclosure describes methods and systems that automatically provide a display of a segmented transcribed text of clearance or other communication of the flight operations to the pilot or other flight personnel using split points determined by a split predictor that better prevent miscommunications in ATC instructions and other disruptions in flight operations caused by improper unsplit messages displayed. Appropriate split messages can also decrease the workload experienced by the pilot by not having to decipher unsplit messages displayed, and this may prove especially vital during high workload time-critical flight stages.

In various exemplary embodiments, methods and systems described are associated with a voice-activated flight deck that enables speech recognition or brings a speech recognition system into the cockpit for the display of messages in a dialogue with shorter pauses times that is experienced between air traffic control and the flight personnel.

In various exemplary embodiments, the methods and systems provide capabilities associated with command and control and transcribing of ATC conversations.

In various exemplary embodiments, the present disclosure describes methods and systems that reduce the pilot's workload by improving a current display model of transcribed text based on segmenting or merging of transcribed text for display during the runtime of the transcription system.

In various exemplary embodiments, the present disclosure describes methods and systems that allows user to drag and merge populated text bubbles that appear due to shorter than expected segment getting decoded and displayed on the transcription app without any call sign tag or any (or limited) other useful data extraction or information.

In embodiments, the transcription app is configured after merging the displayed messages, the background thread will rerun the call sign extraction logic and classification logic to identify who spoke the clearance. The transcription app will also re-run the useful information extraction logic. This can improve the readability and usefulness of the transcription app. The feedback or review process of the transcription app allows the user to perform actions such as splicing or shortening a long segment with multiple clearances displayed as a single text bubble on the transcription app. The smaller segments may also be further independently analyzed for the call sign identification logic and classification logic. The smaller segments will have a re-run of useful information extraction logic independently. This can enable the transcription app to function more efficiently and to provide more organized and readable message segments with useful information. This may also improve the classification accuracy of the transcription app as a set of multiple callsigns can be reduced to a single callsign. This may also improve the performance of subsequent NLP applications or post-processing logic of the transcription system as shorter text segments generally contain less or particular clearance data.

In embodiments, all the user inputs that result in merging or splitting actions may be logged separately for training speech models and may also be distributed via a cloud network to create self-analyzing speech models providing further insights about ATC communications and splitting or merging actions for the transcribed text that are populated onto the transcription app. In embodiments, better text segmentation can reduce frequency congestion by alleviating the need for repetitive requests in ATC-pilot communications based on improvements in displayed transcribed text. For example, by preventing messages that normally would be improperly unsplit by the transcription system and by enabling appropriate split points to split messages from callsign and other clearance information determined from intelligent algorithms with enhanced NLP applications to decode text. Other residual benefits to existing and planned cockpit functionality may include enhancements to playback of radio communications and real-time display of transcriptions of radio communications which are more contextual and intelligent.

For purposes of explanation, the subject matter is primarily described herein in the context of aircraft operating in controlled airspace; however, the subject matter described herein is not necessarily limited to aircraft or avionic environments, and in alternative embodiments, may be implemented equivalently for ground operations, marine operations, or otherwise in the context of other types of vehicles and travel spaces.

Figure 1:
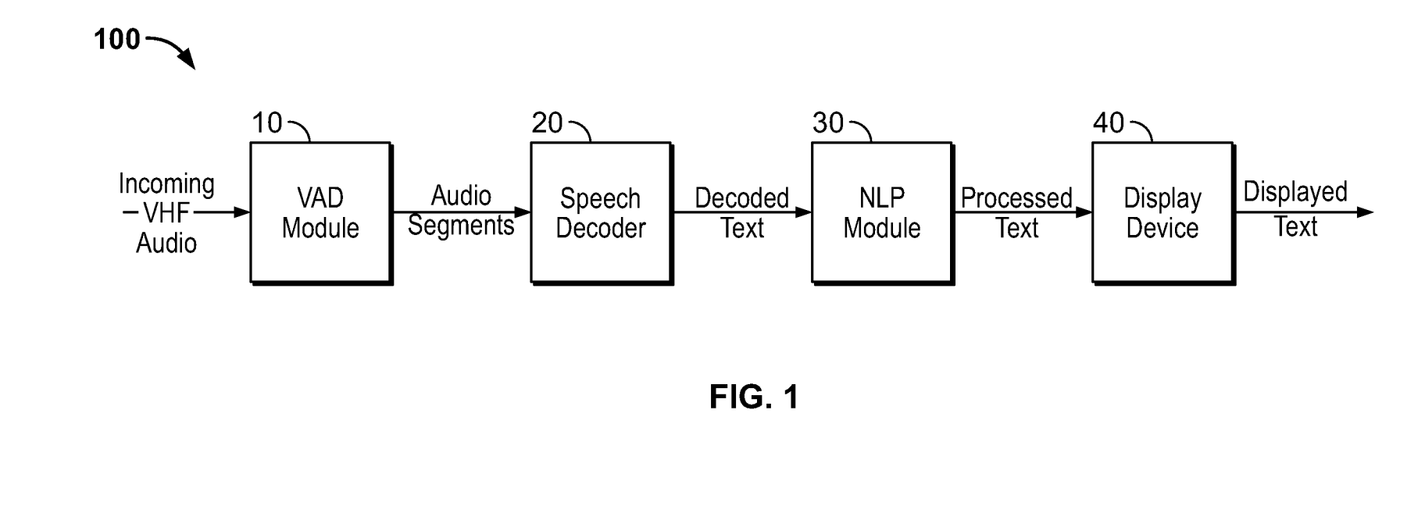
FIG. 1 depicts an exemplary embodiment of a transcription processing system operating during the runtime of a transcription system which may be utilized with a vehicle, such as an aircraft in accordance with an embodiment.

FIG. 1 depicts an exemplary embodiment of a transcription processing system 100 operating during the runtime of a transcription system which may be utilized with a vehicle, such as an aircraft in accordance with an embodiment. FIG. 1 in an exemplary embodiment, shows a transcription processing system 100 that includes, without limitation, the components for receiving audio messages and for converting the audio messages to text in a transcription processing pipeline with a Voice Activity Detection (VAD) module 10, a speech decoder 20, a Natural Language Processing (NLP) module 30, and a display device 40.

In an embodiment, input on an incoming very high frequency (VHF) Airband in an aviation domain is monitored by the VAD module 10. The VAD module 10, in this instance, may be configured to detect either voiced or non-voice portions of audio in communication in the incoming VHF Airband. The VAD module 10 may also be configured to operate on a time-varying non-stationary noise threshold value. As an example, the value can be measured in the inactive section of the voice wavelength audio message that is received via the input by the VAD module 10. In an implementation, an interface, such as a python interface, may be configured in the VAD module 10 via a (Web Real-Time Communication) WebRTC platform that uses an open-source VAD. For instance, the VAD module 10 may use the VHF band features with a pre-trained classifier (e.g., a Gaussian Mixture Model (GMM) or Deep Neural Network, or other probabilistic models). The VAD module 10 using such a model may filter out nonvoiced audio frames that make up audio segments and return only the voiced audio segments as output to the speech decoder 20.

The speech decoder 20 applies various models that may include a lexicon model, a language model, and an acoustic model to generate a decoded word sequence of text. The decoded text is sent to the Natural Language Processing (NLP) module 30 which applies various recognition applications and models to enable content-based language processing of decoded message text. For example, the applications and models can include processes for text classification, keyword extraction, word2vec, and neural network models to extract data from the transcribed text. In an embodiment, the NLP module 30 may be configured to classify and extract aviation-specific terminology by using a selective automatic speech recognition (ASR) model that is tailored to flight contextual data. The processed text is sent to the display device 40 for textual display and viewing/confirmation by flight personnel.

Figure 2:
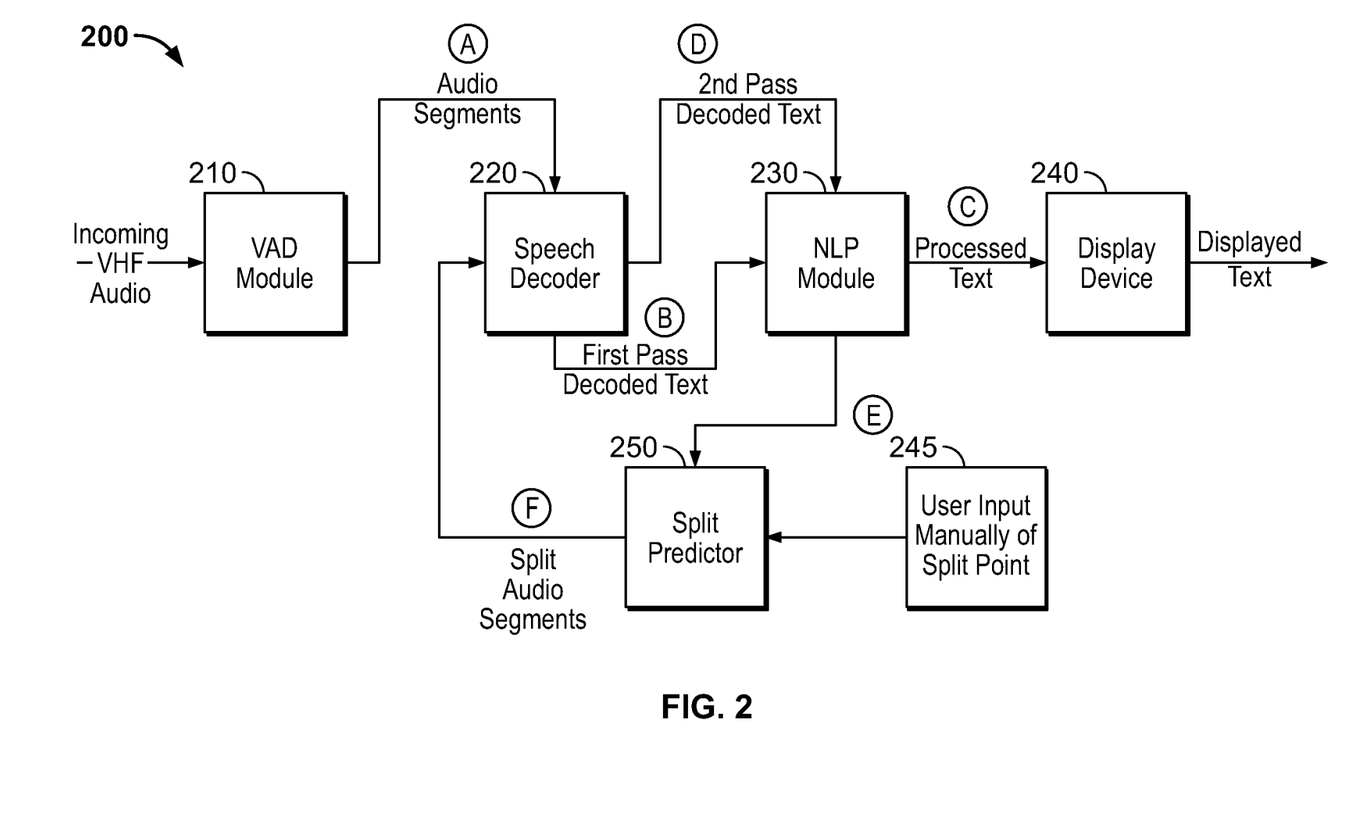
FIG. 2 illustrates a block diagram of a processing architecture that enables a user to review and if necessary manually determine a split point of a transcribed text message by the transcription system in accordance with an embodiment.

FIG. 2 illustrates a block diagram of a processing architecture that enables a user to review and if necessary manually determine a split point of a transcribed text message by the transcription system in accordance with an embodiment. In FIG. 2, the transcription system 200 is shown with various transcription processing components that have been described in FIG. 1 including the VAD module 210, the speech decoder 220, the NLP module 230, and the display device 240. In FIG. 2, the transcription system 200 includes the additional component of the split predictor 250 that is configured in a feedback path ("E", "F") arrangement between the NLP module 230 and the speech decoder 220.

In embodiments, the transcription system 200 is configured to receive user input of a split point if deemed necessary based on a user review of a displayed text segment, and the user input 245 of a manually inputted split point is sent to the split predictor 250. The split predictor configures a split point in the audio segment via path "F" based on the user input. The split predictor 250 may also generate suggestions in the displayed text segments of split points for user review and selection based on user settings configured with the transcription app.

In an embodiment, in the first pass of a transcription operation by the transcription system 200, audio segments are supplied on path "A" to the speech decoder 220 and the speech decoder 220 is configured to output, on a first pass via path "B", the decoded text to the NLP module 230 for processed text to be displayed as displayed text, via path "C", at a display device 240. The first pass in an operation may represent a first decoding step, and if during the first decoding step, the split predictor does not get user input, then the decoded text (i.e., decoded string of words) is sent directly to the display device 240 for the display of a set of processed text on path "C" on the display device 240. The split predictor suggests a split point for user review during or after the first pass of a decoded string of text based on the output (i.e., processed text) from the NLP module 230.

If the split predictor 250 receives user input, then another step is configured to initiate a second decode (or a re-decode) operation of the audio segment(s) that has been received by the speech decoder 220 via the VAD module 10. In this instance, to implement the second decode or re-decode operation, the feedback path (E, F) is configured for the split predictor 250 to send split point information to the speech decoder 220 about a split point in an unsplit message based on input received from the user. In the feedback path operation, the split predictor 250 determines how to split the audio segment of an unsplit message based on the manually inputted split point to enable the speech decoder 220 to appropriately split the message when decoding the message text. The split predictor 250 may also suggest a split point based on content-based information from the message text by the processing of the NLP module 30 or may receive manual input based on a user review of the displayed message. The split point is configured with respect to audio segment and not to message text decoded by the speech decoder 220. In the feedback operation (i.e., in a second pass), the output is sent from the NLP module 230 to the split predictor 250 (via path "E"). Then the split point in the audio segment suggested by the split predictor 250 or manually received is sent to the speech decoder 220 as instructed via path "F".

In an exemplary embodiment, the split predictor 250 generates suggestions of split points based on classified or extracted text such as call signs or other critical information from the NLP module 230 and by using intelligent algorithms configured with the NLP module 230 such as a deep neural network.

In embodiments, the split predictor 250 uses the context of the content from the NLP module 230 of decoded text from the speech decoder 220 to determine the information that includes repetitions of call signs, critical information, and other categories of clearance from the decoded text for identifying suggested split points and text segments. In embodiments, not only is the same call sign (or other critical information) repeated multiple times as described indicative of an unsplit, but also variations of the same call sign or other critical information repeated multiple times may be indicative that the decoded text is unsplit and requires suggestions of one or more split points by the split predictor 250.

In another embodiment, the split predictor 250 may be configured with intelligent applications that include deep learning programs for Artificial Intelligence (AI) contextual based solutions that suggest a split point in an unsplit message based on the content and context of the message or the historical context of messages from data learned by deep learning programs.

In implementations, the split predictor 250 may apply an intelligent application of a neural network that is trained (supervised or unsupervised) on the decoded text of unsplit processed text segments to suggest split points at different flight phases and different flight routes in displayed messages. The use of trained neural networks may allow stored historic data for more accurate split point suggestions by the split predictor 250 of processed text by the NLP module 230.

Figure 3:
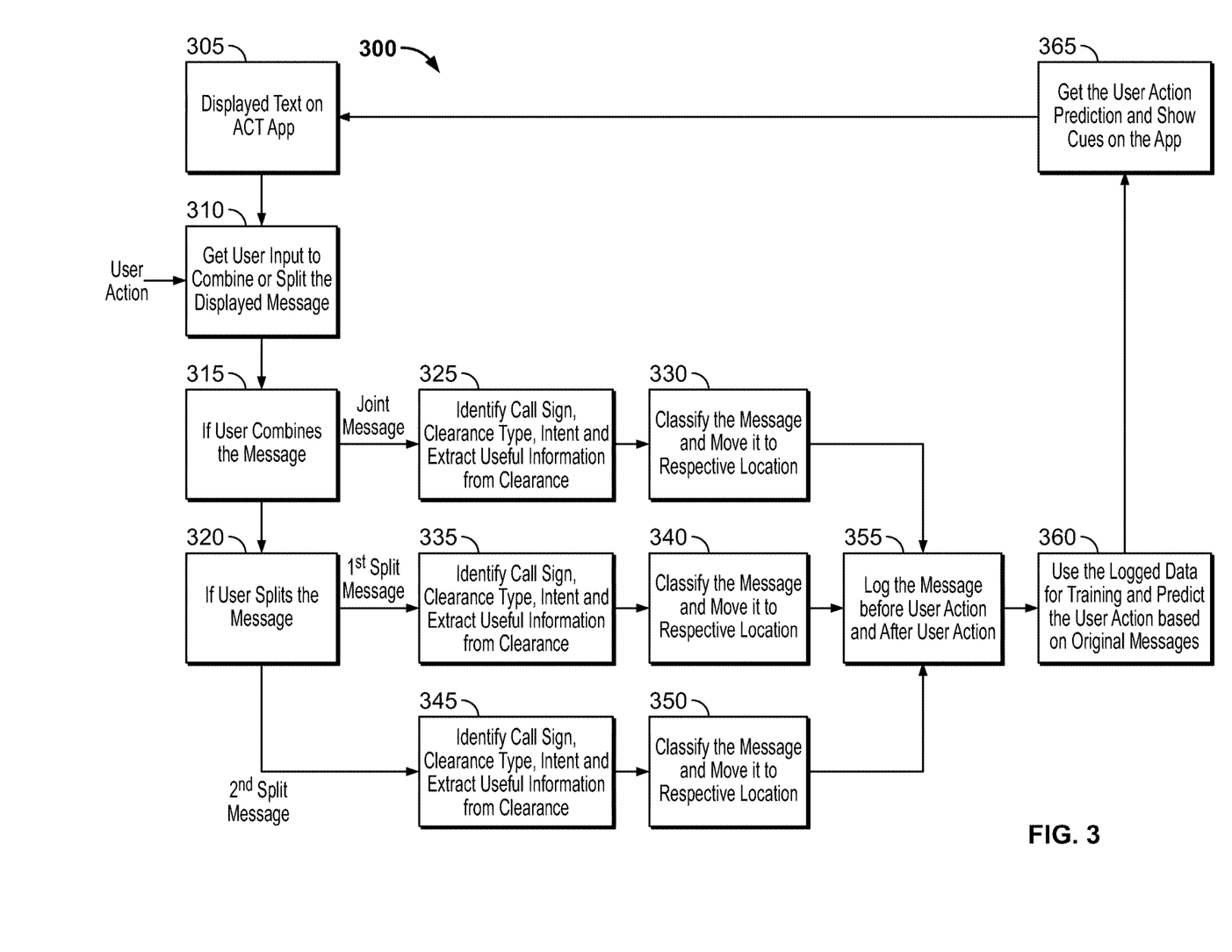
FIG. 3 depicts an exemplary flowchart of the process of receiving user input to split or merge text segments of a message that has been transcribed from ATC-pilot communications and is displayed on a display device for review of the transcription system in accordance with an embodiment.

FIG. 3 depicts an exemplary flowchart of the process of receiving user input to split or merge text segments of a message that has been transcribed from ATC-pilot communications and is displayed on a display device for review of the transcription system in accordance with an embodiment. In FIG. 3, the flowchart 300, step 305 displays transcribed text in a merged text message or segmented text message on a graphical user interface of a transcription app as depicted in exemplary scenarios shown below in FIGS. 4A, 4C, 5A, and 5B. In step 310, upon a user review, the transcription system, based on a user action, receives user input as to whether to merge or split a displayed message. In step 315, if the input received is of user action to merge the message segments that are displayed, the transcription system in steps 325 and 330 performs actions to merge (or join) the message segments into a merged (single or combined) message for display.

In an embodiment, the transcription can determine a callsign from the merged message. In the case of a smaller text segment having a conflicting callsign, the transcription app may seek user input to resolve the conflict and retain the valid call sign based on user selection or may remove the call sign if rejected by the user. If user input is not received then the transcription app may choose a suitable callsign from one message and mark a callsign using a different visual attribute to signal the user that the callsign has not been reviewed.

At step 325, the transcription system identifies call signs, message classification, clearance types, critical data, and intent to extract useful information from the merged or joined message or clearance. At step 330, the message that is merged or joined is moved to a respective location based on message classification on a message thread associated with the call sign. In other words, a record that may include multiple message threads that populate the GUI for a particular callsign (i.e., particular aircraft), is updated and the message is moved in location on the appropriate message thread.

Once this task is completed, then at step 355 the messages are logged before the user action and after the user action. At step 360, the logged data is used for training a predictive model configured with the transcription app (i.e., model associated with the classifier) used to predict the user action based on the original message that was displayed. In other embodiments, the logged data may be used with repetitions of the same merge operation in audio chunks to refine a current speech model used for speech recognition.

At step 320, if the user upon review decides to split the message then at step 320, a first and/or second split message can be generated. The user may also determine that another split point or a third split or even more split points are needed based on a visual review of the displayed message. For example, a user may determine a split point for a message having a length of at least 3-8 words or more or for a single word or more (as opposed to a syllable-based split point determination).

In an embodiment, the transcription app may provide display cues (i.e., suggestions) for repetition of data inside lengthy messages such as repetition of the same or spoken variant of the same callsign, the lengthy message contains multiple message types, repetition of data values in the message or ATC message followed by a short response from other speaker or pilot short message request or response followed by another speaker ATC message. The transcription app cues or suggestions can be enabled or disabled by user configuration. As an example, the user can review or read a lengthy textual message and then can split the message into segments as required with or without display cues or suggestions provided by the transcription app. As an example, the user by using a configured GUI of the transcription app input suggestions of splits in a message in the following steps: (1) first, underline the first text segment of the message (using a text editor) while not modifying the rest of the text segment (i.e., leave the remaining textual part as is), (2) the user may (using the text editor) highlight parts of the message in different colors, (3) the user may selectively highlight parts of the message, (4) the user may cross out or strike parts of the text in the message, (5) the user may use various symbols such as parentheses or another symbol to mark one segment, and (6) the user may use other representative markings to represent separate text segments.

If a first split message is generated, then the flow would follow steps 335 and 340. Similarly, if a second split message is generated, then the flow would follow steps 345 and 350. In either case, similar to process flow for the joinder operation, at steps 335, and 345 the particular callsign would be identified, and at steps 340, and 350 the message would be classified and moved to a respective location. As in the case of the joinder operation, the flow would proceed to step 355 to log the message before and after the user action. At step 360, the logged data would be used to train a prediction model to predict user activity and to reduce future input as to whether to split or merge a single message or a set of message segments.

In step 365, the user action or input that has been received can be represented by an appropriate set of cues associated with the displayed message. The message with the user cues would then be displayed on the transcription app at step 305.

Figure 4A:
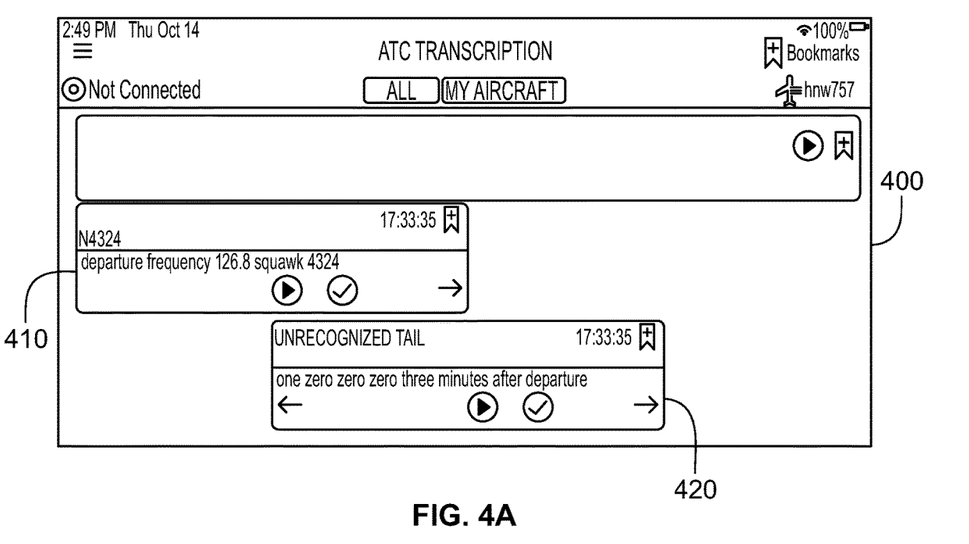
FIG. 4A depicts an exemplary display (screenshot) of multiple text segments and merging the multiple text segments based on user input into a single message for display by the transcription system in accordance with an embodiment.

FIG. 4A depicts an exemplary display (screenshot) of multiple text segments and merging the multiple text segments based on user input into a single message for display by the transcription system in accordance with an embodiment. FIG. 4A depicts a display device with a graphical user interface (GUI) 400 that displays transcribed text segments of two messages that are improperly split. In an exemplary embodiment, a first message 410 is displayed disconnected to a second message 420. In this example, the 420 is without a callsign and is in the center column of the display but this can also be a case of the message identified with the wrong callsign and placed below 410 with a different callsign. Users can still merge them and choose the correct call sign from conflicting 2 call signs based on the message heard during transmission. If needed, the user can take help by replaying the short message as provided by the play button on the transcription app to determine the correct message.

In an implementation, the user would view both messages on the GUI 400, determine that the messages should be merged, and perform an input action to send a merge request to the transcription app for both messages.

Figure 4B:
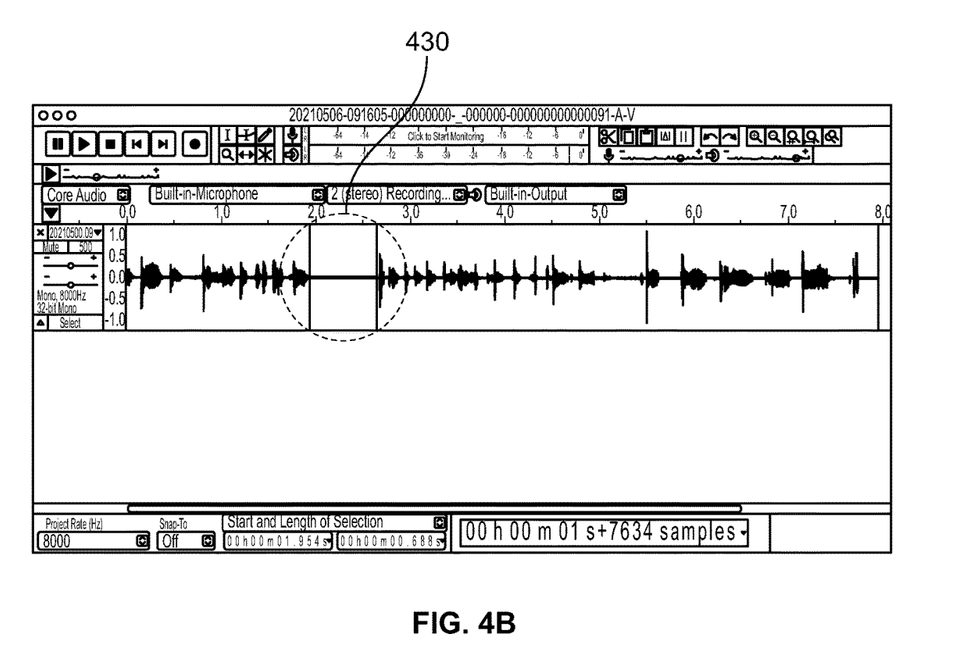
FIG. 4B depicts an exemplary audio recording of an ATC communication with a pause that causes a split of the message into multiple text segments for display by the transcription system in accordance with an embodiment.

FIG. 4B depicts an exemplary audio recording of an ATC communication with a pause that causes a split of the message into multiple text segments for display by the transcription system in accordance with an embodiment. In FIG. 4B, pause 430 depicts an audio file (i.e., incoming audio segment) with a nearly 700-microsecond pause that caused the improper split in the (clearance) messages in FIG. 4A and that upon user review would be merged properly together.

Figure 4C:
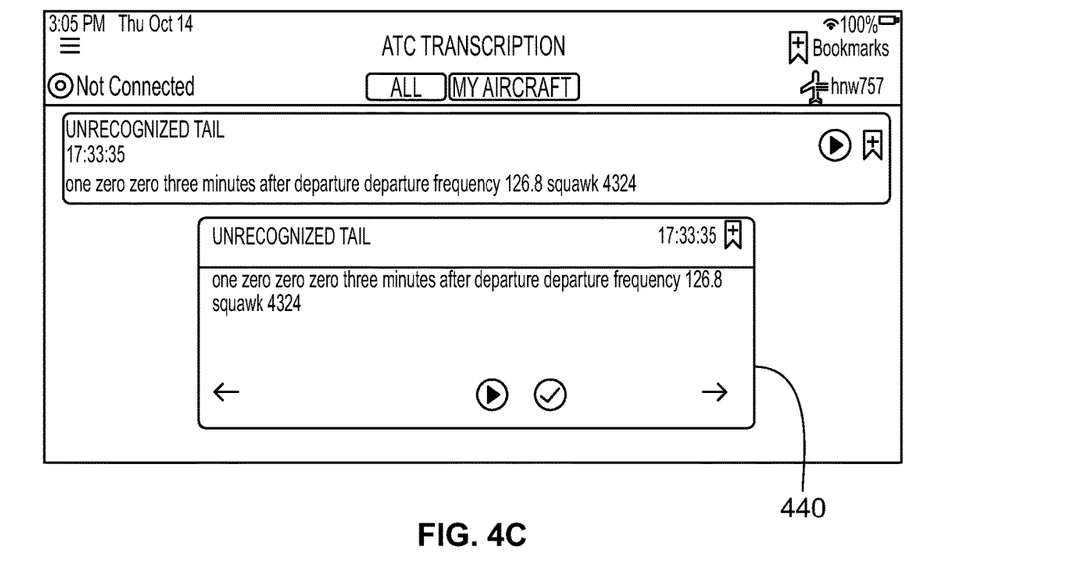
FIG. 4C depicts an exemplary display (screenshot) of a tail message illustrated in FIG. 4A that should be merged based on the user input by the transcription system in accordance with an embodiment.

FIG. 4C depicts an exemplary display (screenshot) of a tail message illustrated in FIG. 4A that should be merged based on the user input by the transcription system in accordance with an embodiment. In FIG. 4C, the unrecognized tail message (text segment) 440 is displayed in a GUI for the user to input a merger action to join the message tail with another message. In embodiments, The audio chunks are also merged and can be replayed through the transcription app using a playback button (not shown). The call sign identification logic programmed by the transcription app can identify the callsign in the merged message as in this case "1000" in FIG. 4C (i.e., "one zero zero zero") and the callsign can be displayed with a merged message.

Figure 5A:
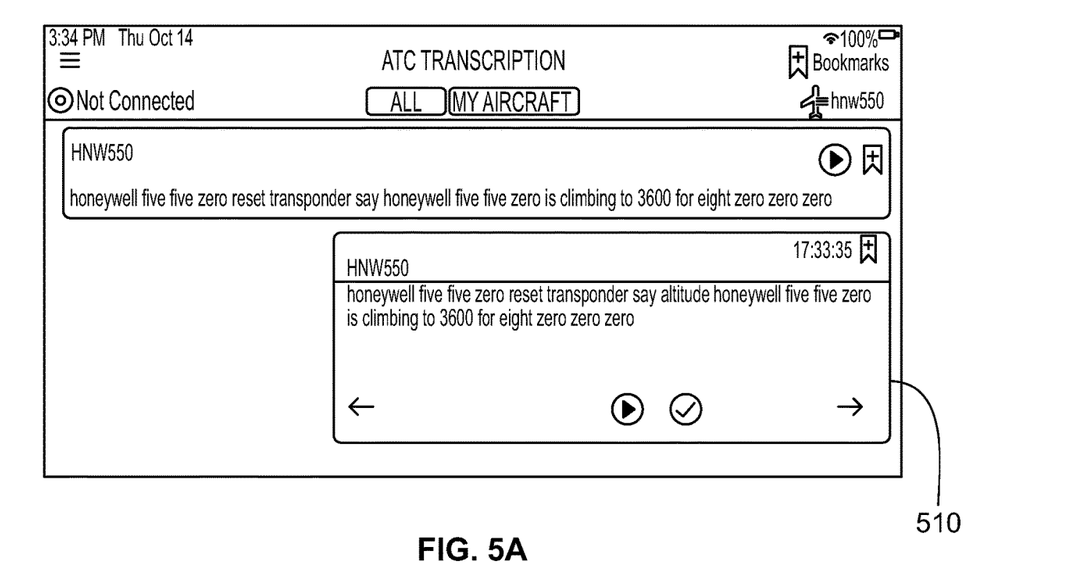
FIG. 5A depicts an exemplary display of unsplit clearance messages for the user to input markings, provide cues, or enter split actions to split the message by the transcription system in accordance with an embodiment.

FIG. 5A depicts an exemplary display of unsplit clearance messages for the user to input markings, provide cues, or enter split actions to split the message by the transcription system in accordance with an embodiment. In FIG. 5A, the unsplit message (text segment) 510 is displayed on the GUI and upon user review, the user can manually mark split points or use visual cues available in the GUI to split the unsplit message 510.

Figure 5B:
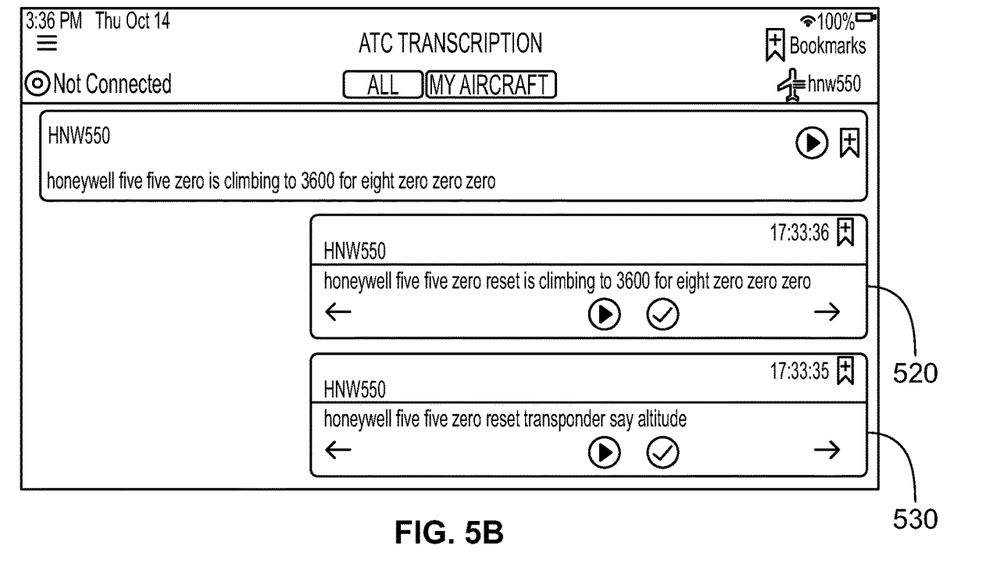
FIG. 5B depicts an exemplary display of a split clearance message of the unsplit clearance message depicted in FIG. 5A is based on input markings, cues, or split actions by the user to cause a split of the message by the transcription system in accordance with an embodiment.

FIG. 5B depicts an exemplary display of a split clearance message of the unsplit clearance message depicted in FIG. 5A which is based on input markings, cues, or split actions by the user to cause a split of the message by the transcription system in accordance with an embodiment. The unsplit message of FIG. 5A is shown after a split action that configures two disjointed or disconnected messages (i.e., text segments) on a display device of a first message part 520 and a second message part 530 for viewing upon a re-decode operation. The split points and split actions are logged to train the speech model and to reduce occurrences of improper joinder of text segments. In embodiments, the user can manually enable a split action and along with messages 510, 520, and 530 are logged to train a predictor application to provide split cues for forthcoming messages. The split audio chunks can be played back using the replay button (not shown) of the transcription app.

Figure 6:
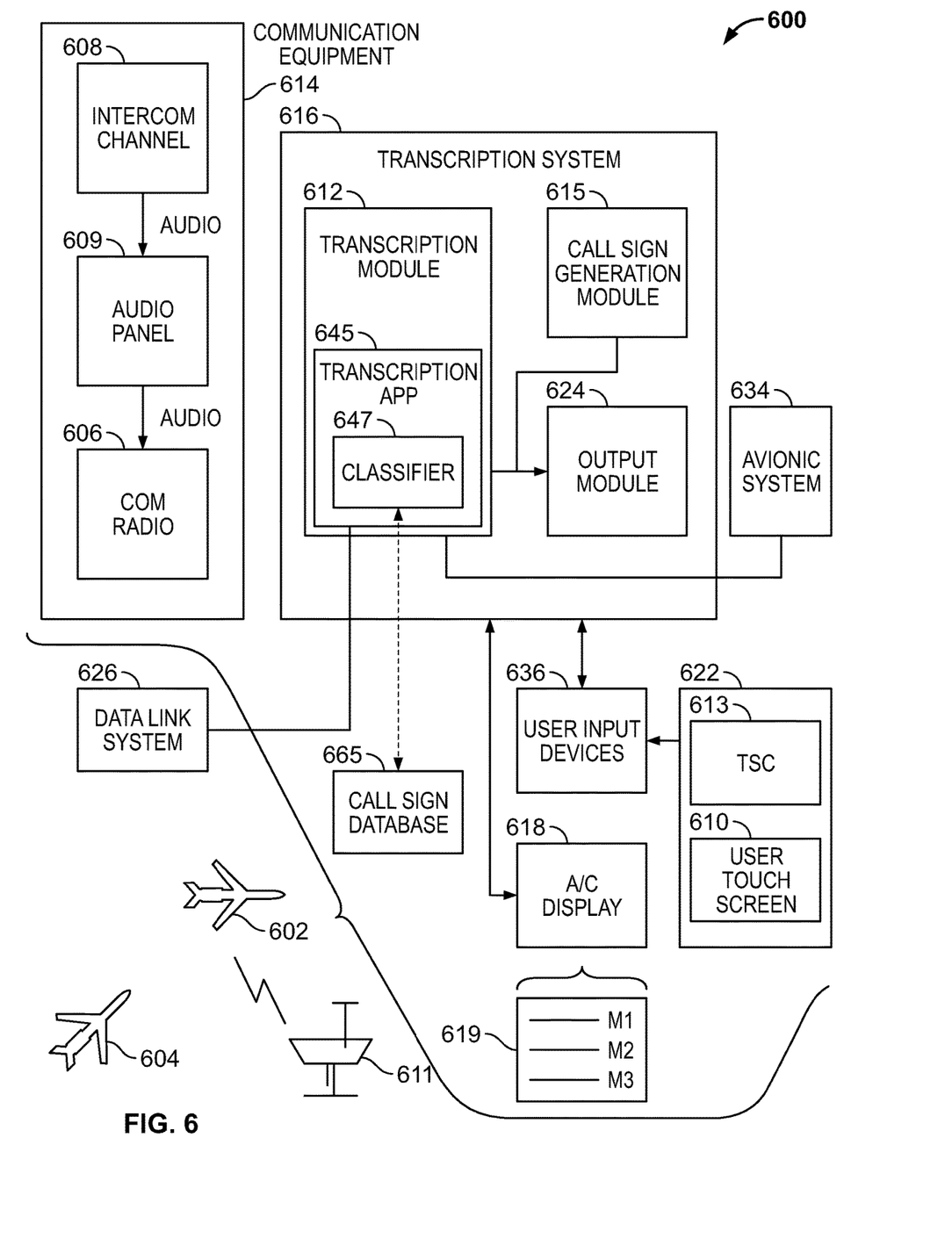
FIG. 6 is a block diagram depicting an example flight system and environment such as one around a busy aerodrome.

FIG. 6 is a block diagram depicting an example flight system and environment 600 such as one around a busy aerodrome. The example system and environment 600 includes a plurality of aerial vehicles (ownship aircraft 602 and traffic aircraft 604 in this example) but could include a variety of types of aerial vehicles such as helicopters, UAVs (unmanned aerial vehicles), and others. The example flight system and environment 600 also includes a plurality of flight operation centers (FOCs) (e.g., air traffic control tower 611) containing control personnel such as air traffic controllers (ATC) for directing ground and air traffic in the vicinity of the aerodrome.

The example avionics equipment shown in FIG. 6 includes communication equipment 614 and an example transcription system 616 for receiving ongoing over-the-air communications and generating formatted text from the over-the-air communications for display onboard an aerial vehicle. The example communication equipment 614 includes a COM radio 606 (such as that known in the art) and an intercom channel 608 (such as that known in the art) for receiving over-the-air communications between various aerial vehicles (ownship and traffic aerial vehicles) and ATC. The example communication equipment 614 also includes an audio panel 609 (such as that known in the art) for accumulating the over-the-air communications from various sources and outputting the audio from the over-the-air communications.

The example ownship aircraft 602 includes avionics equipment that receives the ongoing communications between the aerial vehicles (e.g., 602, 604) and ATC (e.g., via tower 611) using communication equipment 614, and presents the ongoing communications as a continuous stream of audio to a transcription system 616. The transcription system 616 decodes the continuous stream of audio and generates formatted text from the decoded continuous stream of audio and signals an aircraft (A/C) display device 618 to display the generated formatted text for viewing by the flight crew onboard the ownship aircraft 602. The aircraft (A/C) display device 618 may be one of many types of graphical display units onboard an aircraft such as a navigation display, a PFD (primary flight display), a PED (personal electronic device), an EFB (electronic flight bag), HUD (heads up display), HDD (heads-down display), and others. The display of the formatted text may be made via a graphical user interface 619 in a display page that displays each generated textual message (M1, M2, M3, M4, . . . ) in a manner that visually identifies which messages are directed to the ownship aircraft and which messages are directed to a traffic aircraft.

The example transcription system 616 is configured to receive audio communications from or directed to a flight operating center (FOC) (e.g., an ATC center or some other FOC) via the communication equipment 614 (e.g., via audio panel 609), extract message content from the received audio communications, generate formatted text from the extracted message content, and display the formatted text from the received voice communications onboard the aerial vehicle. The example transcription system 616 is also configured to receive data link communications (DLC) (e.g., CPDLC (controller pilot data link communication)) from or to a Flight Operations Center (FOC) (such as the ATC) via a datalink system 626, extract message content from the DLC, generate formatted text from the extracted message content, and display the formatted text from the received DLC communications onboard the aerial vehicle. The example transcription system 616 includes a transcription module 612 with a transcription app 645 for extracting message content and a call sign from the received audio communications and the DLC, and an output module 624 for generating formatted text from the extracted message content and call sign, for generating graphics for displaying the formatted text, and for signaling an aircraft display device 618 to display the generated graphics onboard the aerial vehicle.

The example transcription system 616 further includes a call sign generation module 615 for generating an ownship call sign list and a traffic call sign list, which can be used to classify received messages on the transcription app 645 that are directed to the ownship or other traffic aircraft. In embodiments, U.S. patent application Ser. No. 17/447,307, entitled SYSTEMS AND METHODS FOR PRESENTING MESSAGES TO FLIGHT CREW, filed on Sep. 10, 2021, is incorporated by reference and describes systems and methods that use a flight identification (ID) of an ownship aircraft and convert it to a spoken callsign. The conversion process uses a callsign database and a set of rules to validate the callsign associated with the ownship. The callsign from the conversion may also be re-used for traffic callsign generation. The messages, configured in the transcription app 645, are each stored with a title configured using the flight identification as the call sign along with a spoken call sign and the user interface (UI) configured in the transcription app 645 populates the data of each record with an associated flight identification of the callsign or spoken callsign for display on a device. The transcription app 645 can be configured with the various avionic systems 634 in the cockpit or hosted by a mobile device such as an iPad, smartphone, or laptop configured with the appropriate settings for connectivity. In an embodiment, the clearance messages are searched or filtered on the transcription app 645 using either the flight identification (ID) or the spoken call sign.

In embodiments, the transcription app 645 can be hosted by a mobile device or integrated into a cockpit system and in communication with various cockpit systems and may include an application that enables categorizing of multiple categories of traffic based on distances to the ownship. In embodiments, the transcription app 645 may include a classifier 647 for classifying sets of traffic and response to input for displaying different sets of traffic.

In embodiments, the transcription app 645 may be in operable communication with a graphical user interface (GUI) 619 on a display device 618 that may be populated with messages of the different categories associated with each aircraft by the transcription app 645. Further, the transcription app 645 may display a message list associated with each aircraft on the display device 618.

In embodiments, if the user determines by viewing a display containing messages (i.e., text segment), that the messages are improper split or should be merged, the user can provide input to split or merge the messages that are displayed.

Also, the user action to split or merge the message is logged to update an Automatic Speech Recognition (ASR) model used in the decode operation and the re-decode operation of the audio segment.

In embodiments, the transcription app 645 may via the GUI 619 display a set of cues with the messages to assist the user in marking a merge action or a split action of the displayed message upon user review.

Each of the transcription module 612, the output module 624, and the call sign generation module 615 is implemented by a processing component such as a controller (e.g., the same or separate controllers). The processing component includes at least one processor and a computer-readable storage device or media encoded with programming instructions for configuring the processing component. The processor may be any custom-made or commercially available processor, a central processing unit (CPU), a graphics processing unit (GPU), an application-specific integrated circuit (ASIC), a field-programmable gate array (FPGA), an auxiliary processor among several processors associated with the processing component, a semiconductor-based microprocessor (in the form of a microchip or chipset), any combination thereof, or generally any device for executing instructions.

The computer-readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component.

The example transcription module 612 is configured to retrieve message content from a plurality of received messages. The plurality of received messages may include a plurality of CPDLC messages and a plurality of voice messages. The example transcription module 612 is configured to transcribe message content from the plurality of received voice messages to text. The example transcription module 612 is also configured to extract message content from the plurality of received CPDLC messages as text.

The example transcription module 612 is configured to decode the audio from the voice messages using speech recognition techniques to convert the audio into text. The speech recognition techniques may be implemented using machine learning techniques such as deep neural networks, statistical techniques, rule-based systems, and others. The example transcription module 612 may use various techniques such as NLP to convert the text from the audio and/or DLC to formatted text.

The example output module 624 is configured to generate a graphical message element for each of the plurality of received messages that includes a section for displaying a textual representation of the message content for a corresponding received message and a call sign section for displaying an extracted call sign for the aircraft (e.g., ownship or traffic aircraft) to which the received message is directed. The example output module 624 is configured to parse the received message to extract the message content and the recovered call sign.

The message content and recovered call sign for a corresponding received message may include message content and a recovered call sign from a CPDLC message or transcribed message content and recovered call sign from a voice message. The graphical message elements for each of the plurality of received messages may include graphical message elements having message content and a recovered call sign from a CPDLC message and graphical message elements having transcribed message content and a recovered call sign from a voice message.

In one example implementation, the example transcription system 616 is configured to retrieve a plurality of received messages originating from one or more entities outside of the aircraft; extract a call sign from each of the plurality of retrieved messages; generate a graphical message element associated with a retrieved message for each of the plurality of retrieved messages that includes a section for displaying message content extracted from the received message and an extracted call sign for an intended recipient of the associated message, and signal an aircraft display device to display the graphical message elements for each of the plurality of retrieved messages in a manner that indicates whether a retrieved message corresponding to a graphical message element is categorized as a traffic message or an ownship message.

The example call sign generation module 615 is configured to generate an ownship call sign list that includes a plurality of potential ownship call signs that may be used in messages from ATC directed to the ownship and a traffic call sign list for traffic call signs that may be used in messages from ATC directed to traffic aircraft in an area near where the ownship will fly. The ownship call sign list and traffic call sign list may be used in the example transcription system 616 to categorize a retrieved message as a traffic message or an ownship message.

The example touchscreen system 622 is configured with an avionics interface to communicate with the avionics system 634. The example touchscreen system 622 includes a touchscreen device 610 and a touchscreen controller (TSC) 613. The example touchscreen device 610 includes a touchscreen surface layered over a visual display. The touchscreen surface is configured to receive user input through single-touch or multi-touch gestures. The visual display is configured to display a graphical user interface (GUI) 619 generated by the controller during the execution of an application program. The GUI 619 may provide one or more widgets for display that may allow for displaying, entering, and/or editing data.

In embodiments, the user input devices 636 enable user manual actions for merging and splitting of displayed messages upon user review, and further if there are suggestions or cues in messages, to selectively select certain suggestions or cues displayed with the message for split and/or merge actions with the displayed message.

The example TSC 613 includes at least one processor and a computer-readable storage device or media. The processor may be any custom-made or commercially available processor, a central processing unit (CPU), a graphics processing unit (GPU), an application-specific integrated circuit (ASIC), a field-programmable gate array (FPGA), an auxiliary processor among several processors associated with the TSC 613, a semiconductor-based microprocessor (in the form of a microchip or chipset), any combination thereof, or generally any device for executing instructions. The computer-readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller (i.e., TSC 613).

The processors and memory of the example TSC 613 are configured by the executable programming instructions to provide, among other things, a smart tabs module (not shown) for generating graphical control elements (e.g., smart TABs) that are user selectable via input devices 636 and one or more applications programs (APPs). The example APPS when executed may cause the generation by the transcription app 645 of display screens (e.g., GUI screens) containing widgets and other graphical elements on the display of the touchscreen device 610. The widgets and other graphical elements on the display screens provide the primary function for display via the GUI 619 and the graphical control elements can supplement the display.

For the sake of brevity, conventional techniques related to air traffic control, aviation communications, aviation terminology, flight management, route planning and/or navigation, aircraft procedures, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. Also, certain terminology may be used in the following description for reference only, and thus are not intended to be limiting. For example, terms such as "first," "second," and other such numerical terms may be utilized to refer to or distinguish between different elements or structures without implying a sequence or order unless indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A system comprising:
    a display device; and
    a processor disposed in a transcription device that is coupled to the display device and that is configured to receive an input of a user in response to the display device displaying, on a graphical user interface (GUI), at least one text segment generated by a decode operation, in a decoder, of an air traffic control (ATC) audio segment that was transmitted to, and received by, the transcription device, wherein the processor is configured to:
        if the user determines, by viewing a plurality of text segments on the GUI, that the plurality of text segments comprise an improper splitting of a single text segment, perform a merge action in response to a user input to merge the plurality of text segments into the single text segment;
        if the user determines, by viewing one text segment on the GUI, that the one text segment should be split, perform a split action in response to the user input to split the one text segment into at least two text segments; and
        update the graphical user interface (GUI) to display either the single text segment or the at least two text segments that have been generated by the merge action or the split action, respectively, in response to the user input.

2. The system of claim 1, wherein the processor is further configured to:
    determine a callsign associated with the single text segment or the at least two text segments after the user input; and
    classify the single text segment or the at least two text segments based on the callsign.

3. The system of claim 2, wherein the processor is further configured to:
    enable the merge action of the plurality of segments with another text segment to update the GUI to display the single text segment in accordance with the identified callsign and message classification.

4. The system of claim 3, wherein the processor is further configured to:
    in response to the user input, perform the merge action or the split action in an audio domain of the ATC audio segment and further update the GUI to display a playback button that, when selected, with will playback a merged or a segmented audio.

5. The system of claim 4, wherein the processor is further configured to:
  in response to the user input, perform the merge action or the split action in the audio domain of the ATC audio segment to enable merging or splitting of one or more text segments during a re-decode operation.

6. The system of claim 5, wherein the processor is further configured to:
  display, on the GUI, a set of cues with at least the one or more text segments to assist the user in marking the merge action or the split action.

7. The system of claim 6, wherein the split action generates at least a first text segment part composed of several words, and a second text segment part composed of at least one word.

8. The system of claim 1, wherein the processor is further configured to:
  log at least one or more user inputs to update an Automatic Speech Recognition (ASR) model used in the decode operation and the re-decode operation of the ATC audio segment, and for use in determining suggestions in one or more subsequent text segments.

9. The system of claim 1, wherein the processor is further configured to:
  enable a natural language processor (NLP) in operable communication with the decoder to provide content-based analysis about the plurality of text segments or the one text segment for the decode operation.

10. A method of implementing a transcription system, the method comprising:
  generating, by a decode operation of an air traffic control (ATC) audio segment that was transmitted to, and received by, the transcription device, at least one text segment;
  displaying, on a display device that is coupled to the transcription device, a graphical user interface (GUI) that includes the at least one text segment;
  receiving, by a processor disposed in a transcription device, one of a user input to merge or a user input to split;
  performing, by the processor, a merge action in response to the user input to merge, wherein the merge action merges a plurality of text segments into a single text segment if the user determines, by viewing plurality of text segments, that the plurality of text segments comprise an improper splitting of the single text segment;
  performing, by the processor, a split action in response to the user input to split, wherein the split action splits one text segment into at least two text segments if the user determines, by viewing the one text segment, that the one text segment should be split; and
  updating, by the processor, the graphical user interface (GUI) to display either the single text segment or the at least two text segments that have been generated by the merge action or the split action, respectively.

11. The method of claim 10, further comprising:
  determining, by the processor, a callsign associated with the single text segment or the at least two text segments; and
  classifying, by the processor, the single text segment or the at least two text segments based on the callsign.

12. The method of claim 11, further comprising:
  merging, by the processor, the plurality of segments with another text segment to display the single text segment in accordance with the callsign.

13. The method of claim 12, further comprising:
  performing, by the processor, the merge action or the split action in an audio domain of the ATC audio segment to enable merging or splitting of one or more text segments during a re-decode operation.

14. The method of claim 13, further comprising:
  displaying on the GUI, by the processor, a set of cues with at least the one or more text segments to assist the user in marking the merge action or the split action.

15. The method of claim 14, further comprising:
  logging, by the processor, at least one or more user inputs to update an Automatic Speech Recognition (ASR) model used in the decode operation and the re-decode operation of the ATC audio segment.

16. The method of claim 15, further comprising:
  enabling a natural language processor (NLP) in operable communication with the decoder to provide content-based analysis about the plurality of text segments or the one text segment for the decode operation.

\* \* \* \* \*